Patented June 5, 1945

2,377,749

UNITED STATES PATENT OFFICE 2,377,749

PREPARATION OF BENZIL

Charles A. Bordner, Niagara Falls, N. Y., assignor to E. I. du Pont de Nemours & Company, Wilmington, Del., a corporation of Delaware No Drawing. Application March 23, 1943, Serial No. 480,247

3 Claims. (Cl. 260—590)

This invention relates to the preparation of benzil by the oxidation of benzoin. More particularly, it relates to a catalytic process for the conversion of benzoin to benzil wherein the oxidizing agent is regenerated and maintained in the active condition simultaneously with the oxidation.

It has previously been proposed to oxidize benzoin to benzil utilizing an aqueous pyridine-copper sulfate solution but unfortunately the process is unsatisfactory in that it has been necessary to interrupt it at intervals in order to regenerate the copper salt to permit the oxidation to proceed further. This regeneration has required aeration of the pyridine-copper sulfate solution with air or oxygen for periods of time ranging from 15 to 36 hours. It has been found that at least 16 hours are required to oxidize a batch of benzoin to benzil by this method, including the time required for oxidation and regeneration of the copper sulfate-pyridine solution.

I have now found that it is possible simultaneously to oxidize the benzoin to benzil and to regenerate the copper sulfate-pyridine oxidizing agent, maintaining it in the active condition, if air is blown through the reaction mixture simultaneously with the oxidation. In net result this amounts, in effect, to utilizing air directly as the oxidizing medium, whereas in previous processes the alkaline copper salt solution served as oxidant. By the simultaneous regeneration of the catalyst during the oxidation it is possible to carry out the complete operation for an amount of benzoin formerly requiring 16 hours in a period but slightly over 2 hours.

Accordingly, it is one of the objects of this invention to render available for industrial application a new and improved process for the oxidation of benzoin to benzil under circumstances wherein the oxidant is simultaneously regenerated by the passage of air at the same time the oxidation is effected. Still another object of this invention is the development of a process suitable for the conversion of benzoin to benzil on the industrial scale, which process is almost eight times as rapid as previously available methods for the conversion of benzoin to benzil. These and still further objects of my invention will be apparent from the ensuing disclosure of certain preferred embodiments thereof.

In carrying out my improved method there is prepared a solution containing crystalline copper sulfate, pyridine (which may be the technical grade) and water. This mixture is heated at the temperature of steam with stirring until the copper sulfate is completely dissolved, whereupon it may be charged into the reaction vessel.

The benzoin is introduced into the reaction vessel containing the aqueous copper sulfate-pyridine solution and air or oxygen gas bubbled through the mass. The elevated temperature necessary, 85 to 100° C., is preferably secured by heating the copper sulfate-pyridine solution. The mixture is stirred and aeration and heating continued during the reaction which proceeds rapidly, the material becoming a very dark blue in color.

Reaction is generally complete after about two hours and the contents of the reaction vessel may then be cooled to 40° C. and filtered. The benzil is thus removed in the form of a dark blue solid which is subjected to several washings with water until the wash water is practically colorless. The crystalline benzil may then be suspended in an aqueous solution of a mineral acid, such as a 10% solution of hydrochloric acid, and heated to about 70° C. with stirring for about two hours. After this purification step the crystalline benzil may be filtered off from the hot solution, washed with water, and dried in an oven at 50° C. for eight hours. The product, secured in practically quantitative yield, is in the form of yellowish to greenish-yellow crystals having a sharp melting point of 94 to 95° C. It is a valuable intermediate in the production of chemicals of industrial importance.

As an example of my new and improved process for the oxidation of benzoin to benzil under circumstances wherein the oxidation proceeds simultaneously with regeneration of the copper sulfate-pyridine solution in which the reaction is carried out, the following may be given.

Example

A two-liter three-necked round-bottomed flask was equipped with a reflux condenser, mechanical stirrer, and an inlet for air. It was charged with 512 grams of copper sulfate pentahydrate, 500 grams of pyridine (technical grade), and 200 grams of water. The mixture was heated in a steam bath with continuous stirring until substantially all the copper sulfate had dissolved.

There was now introduced into the reaction vessel 212 grams of benzoin of melting point 131–2° C. A current of air was allowed to bubble through the reaction mixture. The heating, stirring, and aeration were continued for a period of about two hours, at which time the reaction was substantially complete.

The reaction mixture was cooled to 40° C. and filtered on a suction filter. The filtrate was reutilized to oxidize another 212 gram portion of benzoin. The solid benzil product was in the form of a dark blue mass and it was repeatedly washed with water on a Buchner funnel until the wash water becamse practically colorless.

The crystalline benzil product was then suspended in a 10% aqueous solution of hydrochloric acid and heated to a temperature of 70° C. The crystalline product was filtered from the hot solution, washed with water, and dried in an oven for approximately eight hours at 50° C. The yield of benzil, in the form of yellowish crystals, having a melting point of 94.5° C., was 97%, based on the amount of benzoin employed.

Various changes and modifications may be made in my preferred method as herein described, and these modifications within the contemplation of my invention are intended to be comprehended within the scope of the appended claims.

I claim:

1. The method of preparing benzil by oxidation of benzoin which comprises contacting the benzoin starting material with an aqueous copper sulfate-pyridine solution, heating said reaction mixture to an elevated temperature at which the reaction proceeds, and passing a current of air through the reaction mixture during the reaction in order to regenerate said copper sulfate-pyridine solution, thereby maintaining said solution active so that said oxidation may proceed.

2. The method of preparing benzil by oxidation of benzoin which comprises contacting the benzoin starting material with an aqueous copper sulfate-pyridine solution, heating said reaction mixture to a temperature within the range 85 to 100° C., and passing a current of air through the reaction mixture during the reaction in order to regenerate said copper sulfate-pyridine solution, thereby maintaining said solution active so that said oxidation may proceed.

3. The method of preparing benzil by oxidation of benzoin which comprises the steps of bringing said benzoin into contact with an aqueous copper sulfate-pyridine solution, heating the resulting reaction mixture to a temperature high enough for the reaction to proceed, passing a current of air through said reaction mixture during the reaction in order that said copper sulfate-pyridine solution may be regenerated and maintained in the active state to permit said oxidation to proceed, and filtering off the resulting benzil from the reaction mixture.

CHARLES A. BORDNER.